Oct. 31, 1939.                C. D. STEWART                 2,177,955
                              BRAKE MECHANISM
                           Filed Dec. 20, 1938         3 Sheets-Sheet 2
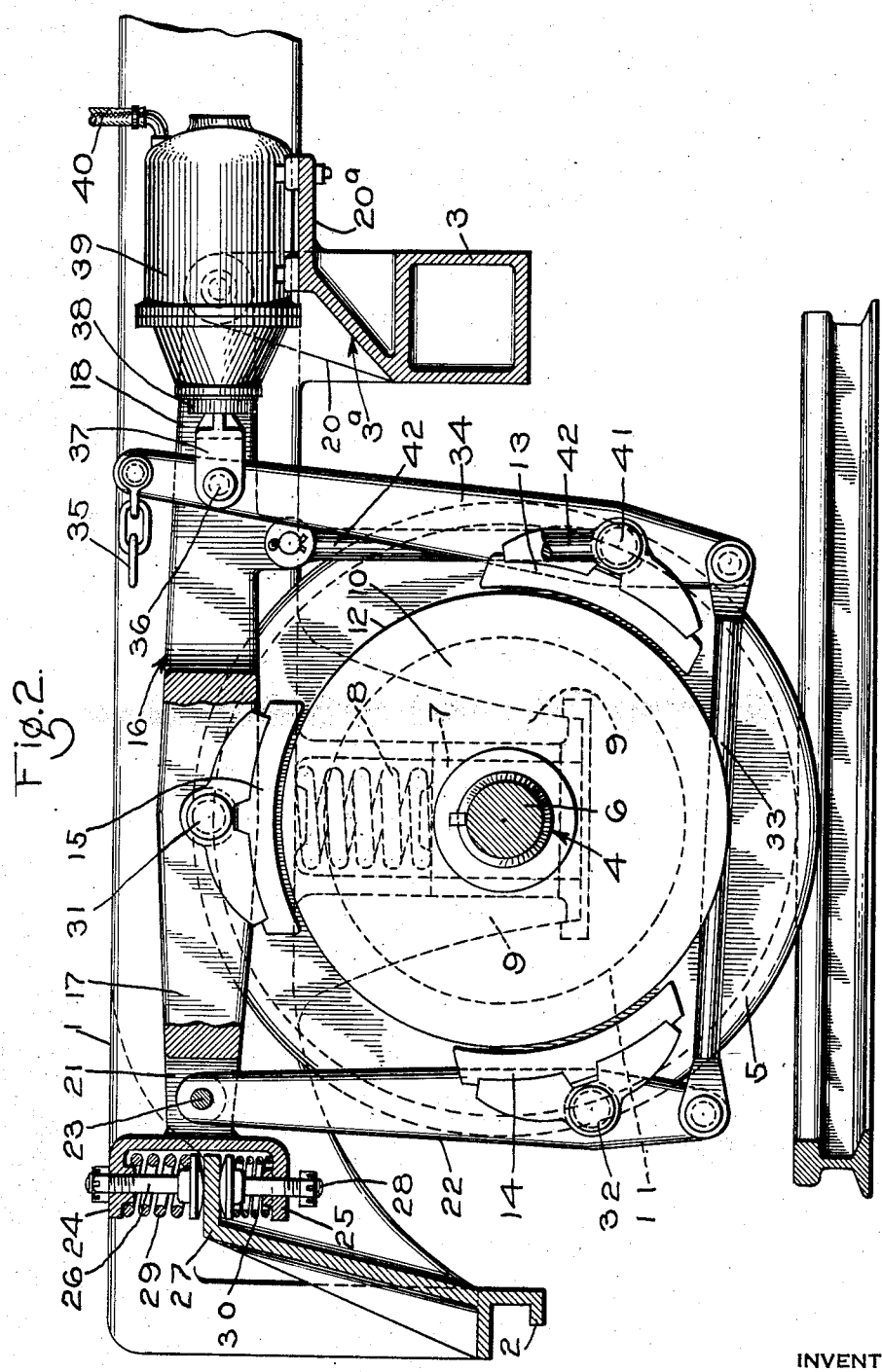
INVENTOR
CARLTON D. STEWART
BY
ATTORNEY Oct. 31, 1939.   C. D. STEWART   2,177,955
BRAKE MECHANISM
Filed Dec. 20, 1938   3 Sheets-Sheet 3
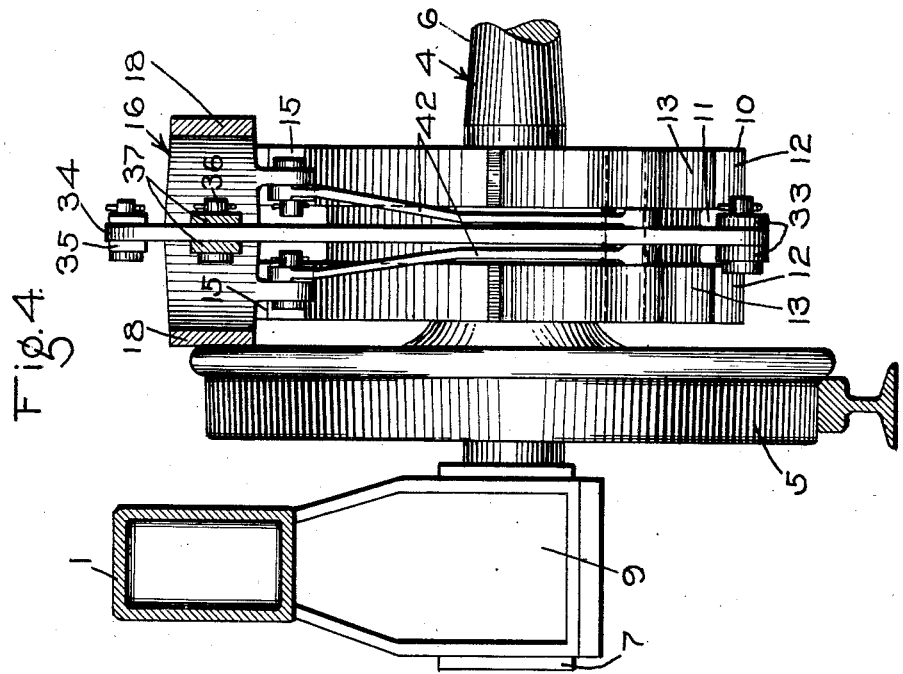
INVENTOR
CARLTON D. STEWART
BY
ATTORNEY Patented Oct. 31, 1939

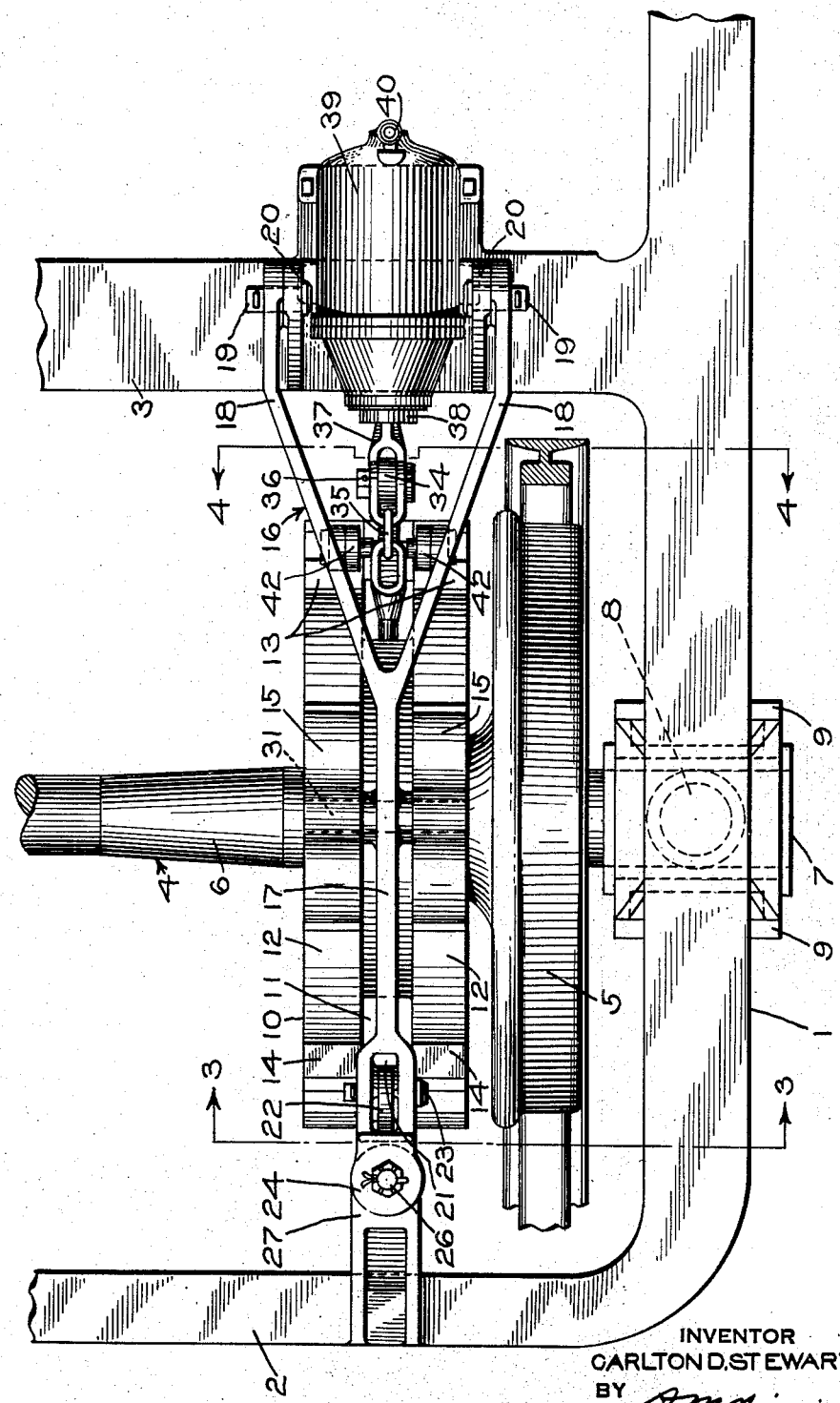

2,177,955

UNITED STATES PATENT OFFICE 2,177,955

BRAKE MECHANISM

Carlton D. Stewart, Wilkinsburg, Pa., assignor to The Westinghouse Air Brake Company, Wilmerding, Pa., a corporation of Pennsylvania Application December 20, 1938, Serial No. 246,823

9 Claims. (Cl. 188—58)

This invention relates to brake mechanisms for railway vehicle trucks and more particularly to that type of brake mechanism in which the greater portion of the downwardly directed forces set up therein in effecting an application of the brakes is transmitted to a wheel and axle assembly of the truck instead of to the truck frame, such a brake mechanism being disclosed in my copending application for United States Letters Patent filed June 18, 1938, Serial No. 214,517.

As disclosed in the above identified application, this type of brake mechanism may comprise a brake drum secured for rotation with a wheel and axle assembly of a railway vehicle truck, three brake shoe elements which are spaced radially about the exterior of the drum with two of the elements in clasp arrangement with relation to the drum and the third disposed above the drum, a system of operatively connected levers and rods adapted to be actuated by a brake cylinder for actuating the clasp arranged brake elements, and a brake shoe carrier or support which is pivotally connected to the truck frame. When an application of the brake mechanism just referred to is being effected, the carrier moves downwardly in response to forces set up in the mechanism by the action of the clasp arranged brake elements and thereby moves the third brake element into engagement with the brake drum. This third brake element when in this position serves to assist in braking the drum and to transmit the greater portion of the forces set up in the mechanism to the brake drum instead of to the truck frame.

In the aforementioned copending application, the brake mechanism is arranged outboard of the wheel of a railway vehicle truck, and to accommodate such arrangement it is necessary to provide a special truck frame and axle construction, which would of course be objectionable in cases where in existing trucks of the usual construction it is desired to substitute my improved brake mechanism for the old brake mechanism. With this in mind the principal object of the invention is to provide a brake mechanism of the above type which is so arranged and constructed that it may be readily mounted on a truck frame of the usual construction, thus eliminating the foregoing objections.

Another object of the invention is to provide a brake mechanism of the above type having a compact and novel brake carrier and brake cylinder arrangement.

Other objects and advantages will be apparent from the following more detailed description of the invention.

In the accompanying drawings, Fig. 1 is a fragmentary plan view of a railway truck having associated therewith a brake mechanism constructed in accordance with the invention; Fig. 2 is a longitudinal sectional view of the portion of the truck shown in Fig. 1 showing my improved brake mechanism in side elevation, portions of the mechanism being broken away to more clearly illustrate associated parts; and Figs. 3 and 4 are cross-sectional views taken on the lines 3—3 and 4—4, respectively, of Fig. 1.

In the drawings the invention is shown embodied in a portion of a railway vehicle truck which may be of the usual cast metal type having spaced parallel side frames 1 which are connected together at their ends by laterally extending end pieces 2 and intermediate their ends by spaced laterally extending transoms 3, only a portion of one each of the side frames and end pieces and transoms being shown.

The truck frame is supported in the usual manner from a plurality of wheel and axle assemblies 4 comprising wheels 5 which are secured to the axles 6, the supporting structure between the truck frame and the wheels and axle assemblies comprising the journal bearings 7 for the axle and the springs 8 which are seated on the journal bearing housings. The journal bearing housings are mounted between pedestal jaws 9 carried by the side frames. In the drawings, portions of only one of the wheel and axle assemblies and the associated journal bearings 7 and spring 8 are shown, as this is all the construction deemed necessary to clearly illustrate the invention.

At the inner side of and adjacent the wheel 5 is a brake drum 10 which is secured to the axle 6 for rotation therewith. The drum as shown may be provided with an exterior braking face which, centrally of its width, is provided with a circular groove 11, the groove dividing the braking face into laterally spaced friction braking surfaces 12.

The braking surfaces 12 are adapted to be frictionally engaged by pairs of brake elements 13, 14 and 15 which are radially arranged about the drum, the elements 13 and 14 being located at opposite sides of the drum and the elements 15 being located above the drum. The greater portions of the elements 13 and 14 extend below the horizontal center line of the drum while the elements 15 are centered on substantially the vertical center line of the drum. It will here be understood that each brake element may comprise the usual brake shoe and brake shoe head, but since this construction of head and shoe is so well known, each element will, for simplification, be hereinafter referred to as the brake shoe.

Located at the inner side of the wheel 4 and extending longitudinally of the truck frame and passing centrally over the brake drum is a combined lever and brake rigging supporting member 16, which comprises a central vertically disposed web portion 17 having at one end laterally diverging arms 18. A brake cylinder cradle portion 3a is provided on the transom 3 of the truck frame in alignment with the drum brake assembly, as shown in Figs. 1 and 2, and comprises a pair of laterally spaced vertical lugs 20 disposed on opposite sides of a flat base portion 20a. The arms 18 of the supporting member 16 are pivotally connected by means of pins 19 to the upwardly extending lugs 20 carried by the transom 3.

The other end of the web portion 17 of the member 16 is provided with a vertical recess or opening 21 for the reception of the upper end of a vertically disposed brake hanger lever 22, which end of the lever is operatively connected to the member by means of a laterally extending pin 23.

To the left of the opening 21 the member 16 is provided with connected vertically spaced upper and lower spring seats 24 and 25, respectively, as best shown in Fig. 2. Slidably mounted in suitable openings in the spring seat 24 is a plunger 26 which, at its inner end, engages an upper surface of a shelf portion 27 of the truck frame. Similarly mounted in the spring seat 25 is a plunger 28 which engages a bottom surface of the shelf portion 27, and interposed between and operatively engaging the spring seat and the respective plungers are springs 29 and 30 which act through the medium of the plungers to normally maintain the member 16 in the position in which it is shown in Fig. 2 against accidental movement due to the usual service shocks to which the truck is subjected.

The brake shoes 15 are arranged one on each side of the web portion 17 of the member 16 and are operatively carried by a transversely extending pin 31 which is mounted in the web portion 17.

The brake shoes 14 are arranged one on each side of the brake hanger lever 22 and are operatively connected to the lever by means of a pin 32 which is located near the lower end of the lever. The lower end of the hanger lever 22 is pivotally connected to one end of a longitudinally extending rod 33 which passes beneath the brake drum within the groove 11. The other end of the rod 33 is operatively connected to the lower end of a vertically disposed brake cylinder lever 34.

The upper end of the lever 34 extends between the arms 18 of the carrier member 16 and above these arms may be operatively connected to a hand brake chain 35, the other end of which may be operatively connected to the usual manually actuated brake, not shown. At a point located a short distance below the connection between the chain and lever and within the horizontal plane of the arms 18, the lever is operatively connected by means of a pin 36 with the outer end of the push rod 37 operatively mounted in a hollow piston rod 38 of a brake cylinder 39, which is located between the arms 18 and is rigidly secured to the transom 3 of the truck frame.

The brake cylinder 39 may be of the usual construction, having a fluid pressure actuated piston for operating the push rod 37 to effect an application of the brakes and also having the usual release spring for moving the piston to its release position to effect the release of the brakes. The piston and release spring have not been shown in the drawings since these parts and their functions are so well known in the fluid pressure brake art. Fluid is adapted to be admitted to and released from the brake cylinder by way of flexible conduits 40.

The brake shoes 13 are arranged one on each side of the brake cylinder lever 34 and are operatively connected to the lever by means of a pin 41 which is supported by hangers 42, each of which is arranged on one side of the lever 34 and is pivotally connected to one of the arms 18 of the member 16.

It will here be noted that two of the brake mechanisms hereinbefore described may be employed in connection with each wheel and axle assembly and that each mechanism will be independent of all the other brake mechanisms on the truck, that is to say, each brake mechanism on the truck will constitute an independent brake unit.

Application of the brakes

When it is desired to effect an application of the brakes, fluid under pressure is admitted in the usual manner to the brake cylinder 39. In response to the pressure of fluid thus admitted, the brake cylinder functions to actuate the brake cylinder lever 34 and thereby the lever 22 to cause the brake shoes 13 and 14 to frictionally engage the braking surfaces 12 of the brake drum 10.

With the brake shoes 13 and 14 thus brought into engagement with the brake drum below the horizontal center line thereof, the increasing force transmitted to the shoes from the brake cylinder causes the shoes to move downwardly along the braking surface 12 of the drum, the downwardly directed force due to such action being transmitted through the lever 22 and hangers 42 to the supporting member 16, pulling that member downwardly about the pins 19 and against the opposing action of the spring 29. The top brake shoes 15 are thereby brought into braking engagement with the surface 12 of the drum, and thus become effective to augment the braking action and at the same time to constitute a supporting means preventing further displacement of the brake shoes 13 and 14.

The release of the brakes may be accomplished in the usual manner by effecting operation of the air brake equipment to vent fluid under pressure from the brake cylinders 39, thereby permitting the several brake levers and other rigging members to assume their normal positions, as shown in the drawings.

From the foregoing it will be apparent that, according to the invention, there is provided an improved clasp brake mechanism of the type embodying three brake shoes supported by a resiliently mounted carrier member and operative into braking relation with the brake drum located inboard of the wheel, which brake mechanism is entirely arranged in longitudinal alignment with the brake drum, and includes a brake cylinder conveniently mounted on a cradle portion of the truck frame, to which the carrier member is pivotally connected for affording maximum compactness.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. The combination with a railway vehicle truck comprising a truck frame and a truck frame supporting wheel and axle assembly, of a brake shoe for braking engagement with said assembly, another brake shoe for braking engagement with said assembly, brake rigging operative to move the first mentioned brake shoe into braking engagement with said assembly, supporting structure having at one end spaced arms pivotally connected to the truck frame for movement relative thereto, said structure supporting said brake rigging and being responsive to the forces set up by the engagement of the first mentioned brake shoe with the assembly for causing the second mentioned brake shoe to engage said assembly, and means located between the arms of said supporting structure and operative for actuating the brake rigging.

2. The combination with a railway vehicle truck comprising a truck frame and a truck frame supporting wheel and axle assembly, of a brake shoe for braking engagement with said assembly, another brake shoe for braking engagement with said assembly, brake rigging operative to move the first mentioned brake shoe into braking engagement with said assembly, a supporting structure having at one end spaced arms pivotally connected to the truck frame for movement relative thereto, said supporting structure supporting said brake rigging and being responsive to the forces set up by the engagement of the first mentioned brake shoe with the assembly for causing the second mentioned brake shoe to engage said assembly, and means located between said arms and secured to said truck frame operative for actuating said brake rigging.

3. In a clasp brake equipment for a railway truck involving a wheel and axle assembly and a frame yieldingly supported thereon: a brake drum secured to said assembly adjacent the wheel, a plurality of brake shoes adapted to apply braking force to said drum, brake rigging operatively connected to said shoes, a brake cylinder longitudinally aligned with said drum and cooperative with the rigging for actuating said shoes, and means adapted to support said shoes and rigging, comprising a longitudinally disposed carrier member provided at one end with spaced arms straddling said brake cylinder and pivotally connected to said frame, and having the other end thereof resiliently mounted on said frame.

4. In a clasp brake equipment for a railway truck involving a wheel and axle assembly and a frame having a transom portion and supported by said assembly: a brake drum secured to said assembly inwardly of the wheel, a plurality of brake elements aligned for engagement with the peripheral surface of said drum, a brake cylinder device mounted on the transom portion of the frame adjacent and in longitudinal alignment with said brake elements and drum, and rigging mechanism also aligned therewith and operable by said brake cylinder to apply said brake elements to the drum, said mechanism including a longitudinally disposed carrier member having arms pivotally connected to said transom on opposite sides of said brake cylinder device.

5. In a clasp brake equipment for a railway truck of the type including a frame having transverse portions and a wheel and axle assembly journaled in said frame between said transverse portions: a brake drum secured to and rotatable with said assembly inboard of the wheel, a plurality of brake elements operable to apply braking force to said drum, a brake cylinder device for actuating said brake elements mounted on one transverse frame portion in longitudinal alignment with said drum, a pair of lugs carried by said transverse portion on opposite sides of said brake cylinder device, a bracket carried by the other transverse portion, and a longitudinally disposed carrier lever supporting and cooperating with said brake elements, said lever having parallel portions on one end pivotally connected to said lugs and the other end resiliently carried by said bracket.

6. In a clasp brake equipment for a railway truck of the type including a frame having transverse portions and a wheel and axle assembly journaled on said frame between said transverse portions: a brake drum secured to and rotatable with said assembly inboard of the wheel, a plurality of brake elements operable to apply braking force to said drum, a brake cylinder device for actuating said brake elements mounted on one transverse frame portion in longitudinal alignment with said drum, a pair of lugs carried by said transverse portion on opposite sides of said brake cylinder device, a bracket carried by the other transverse frame portion, and a longitudinally disposed carrier lever adapted to support and cooperate with said brake elements, said carrier lever having a free end spring-mounted on said bracket and the other end bifurcated to form laterally spaced arms adapted to straddle said brake cylinder device and journaled on said lugs.

7. A clasp brake equipment for a wheel and axle assembly of a railway truck embodying a spring supported frame, said mechanism comprising a brake drum secured to the wheel and axle assembly, a carrier lever longitudinally disposed above said drum, said carrier lever having one end yieldingly supported by one portion of the frame and the other end bifurcated to form laterally spaced arms journaled on another portion of the frame, a plurality of brake shoes hung from said carrier lever in braking alignment with said drum, means cooperative with said carrier lever to effect application of said shoes to the drum including a brake lever extending upwardly between said spaced arms, and a brake cylinder device mounted on said truck frame adjacent said arms and operatively connected to said brake lever.

8. In a railway truck embodying a wheel and axle assembly and a frame carried thereby, the combination of a brake drum secured to the wheel and axle assembly, a cradle portion formed integrally with or mounted on the truck frame in longitudinal alignment with said drum and including a central flange and laterally spaced lugs formed on either side thereof, a longitudinally disposed carrier lever having a free end yieldingly supported by the frame and the other end bifurcated to form arms pivoted on said lugs, respectively, a plurality of brake shoes hung from said carrier lever in braking alignment with said drum, means cooperative with said carrier lever to effect application of said shoes to the drum including a brake lever extending upwardly between said arms, and a brake cylinder device mounted on the flange of said cradle portion and operatively connected to said brake lever.

9. In a railway truck embodying a wheel and axle assembly and a frame carried thereby, the combination of a brake drum secured to the wheel and axle assembly, a bracket portion formed integrally with or mounted on the truck frame in longitudinal alignment with said drum, a longitudinally disposed carrier lever having one end pivotally connected to the frame and a free end bifurcated to form vertically spaced spring seats adapted to straddle said bracket portion, springs interposed between said bracket portion and said seats, respectively, a plurality of brake shoes hung from said carrier lever in braking alignment with said drum, and operating means cooperating with said carrier lever to effect application of said shoes to said drum.

CARLTON D. STEWART.